United States Patent [19]
Avitan

[11] Patent Number: 5,485,340
[45] Date of Patent: Jan. 16, 1996

[54] ELECTRICAL SUPPLY SAFETY PLUG

[75] Inventor: Shimon Avitan, Fairlawn, N.J.

[73] Assignee: Aditan, Inc., Upper Brookville, N.Y.

[21] Appl. No.: 20,317

[22] Filed: Feb. 19, 1993

Related U.S. Application Data

[63] Continuation of Ser. No. 726,875, Jul. 8, 1991, abandoned.

[51] Int. Cl.⁶ .................................................. H02H 3/16
[52] U.S. Cl. .............................. 361/45; 361/92; 361/49; 307/326
[58] Field of Search ................................ 361/46, 49, 49, 361/50, 9, 13, 10, 92; 302/326

[56] References Cited

U.S. PATENT DOCUMENTS

| | | |
|---|---|---|
| 1,669,666 | 5/1928 | Laub . |
| 1,728,549 | 9/1929 | Huppert . |
| 1,912,252 | 5/1933 | Brown . |
| 2,184,359 | 12/1939 | Mueller . |
| 2,197,981 | 4/1940 | Meston . |
| 2,419,585 | 4/1947 | O'Brien et al. . |
| 2,500,474 | 3/1950 | Sperrazza . |
| 2,628,293 | 2/1953 | Williams et al. . |
| 2,735,906 | 2/1956 | Avrunn . |
| 2,789,255 | 4/1957 | Merkler . |
| 2,826,652 | 3/1958 | Piplack . |
| 2,827,523 | 3/1958 | Heuberger et al. . |
| 2,872,654 | 2/1959 | Smith . |
| 3,024,387 | 3/1962 | Nissel . |
| 3,052,770 | 9/1962 | Di Vito . |
| 3,057,975 | 10/1962 | Motten, Jr. . |
| 3,080,509 | 3/1963 | Rowe . |
| 3,171,113 | 2/1965 | McNamara . |
| 3,229,163 | 1/1966 | Rogers, Sr. . |
| 3,242,382 | 3/1966 | Rogers, Sr. . |
| 3,313,960 | 4/1967 | Borys . |
| 3,436,599 | 4/1969 | Rogers, Sr. . |
| 3,529,210 | 2/1968 | Ito et al. .................... 361/13 |
| 3,596,019 | 7/1971 | Koester . |
| 3,627,929 | 12/1971 | Hermanus et al. . |
| 3,633,070 | 1/1972 | Vassos et al. . |
| 3,701,074 | 10/1972 | Oster . |
| 3,755,635 | 8/1973 | McGill . |
| 3,761,774 | 9/1973 | Laughinghouse . |
| 3,775,726 | 11/1973 | Gress . |
| 3,787,709 | 1/1974 | Coe . |
| 3,813,579 | 5/1974 | Doyle et al. . |
| 3,828,224 | 3/1974 | Hulshizer . |
| 3,843,854 | 10/1974 | Mori et al. . |
| 3,878,435 | 4/1975 | Van Zeeland et al. . |
| 3,895,195 | 7/1975 | Morrison et al. . |
| 3,898,528 | 8/1975 | Runtsch et al. . |
| 3,915,536 | 10/1975 | Glantz . |
| 3,922,586 | 11/1975 | Buxton et al. . |
| 3,942,856 | 3/1976 | Mindheim . |
| 3,943,310 | 3/1976 | Gertz . |
| 3,953,689 | 4/1976 | Marrero . |
| 3,971,611 | 7/1976 | Rose . |
| 3,980,370 | 9/1976 | Gonzalez-Hernandez . |

(List continued on next page.)

FOREIGN PATENT DOCUMENTS

| | | |
|---|---|---|
| 89101425 | 8/1989 | European Pat. Off. . |
| 2547464 | 12/1984 | France . |
| 2624316 | 12/1977 | Germany . |
| 2643668 | 3/1978 | Germany . |
| 3638737 | 7/1987 | Germany . |
| 3707307A1 | 9/1988 | Germany . |
| 609500 | 2/1979 | Switzerland . |
| 8101082 | 4/1981 | WIPO . |
| 8602500 | 4/1986 | WIPO . |

OTHER PUBLICATIONS

Translation of Swiss Patent 609500 (with original).

*Primary Examiner*—Todd DeBoer
*Attorney, Agent, or Firm*—McAndrews, Held & Malloy, Ltd.

[57] ABSTRACT

An electrical supply safety plug that prevents power from a mains electrical supply from being accessible to an electrical appliance unless the electrical supply safety plug is properly engaged with the socket outlets and the appliance is turned on. The electrical supply safety plug disconnects the electrical appliance in the event of current imbalance.

17 Claims, 2 Drawing Sheets

U.S. PATENT DOCUMENTS

| | | |
|---|---|---|
| 3,982,084 | 9/1976 | Cooperstein . |
| 4,001,527 | 1/1977 | Hulshizer . |
| 4,002,923 | 1/1977 | Larson et al. . |
| 4,008,382 | 2/1977 | DeRosa . |
| 4,008,403 | 2/1977 | Rose ............... 200/51.09 |
| 4,010,431 | 3/1977 | Virani et al. ............... 335/18 |
| 4,010,432 | 3/1977 | Klein et al. ............... 335/18 |
| 4,045,629 | 8/1977 | Anzani ............... 200/52 R |
| 4,054,762 | 10/1977 | Knecht ............... 200/50 B |
| 4,059,739 | 11/1977 | Girismen ............... 200/51.09 |
| 4,063,299 | 12/1977 | Munroe ............... 361/45 |
| 4,084,203 | 4/1978 | Dietz ............... 361/45 |
| 4,093,336 | 6/1978 | Rose ............... 339/180 |
| 4,101,805 | 7/1978 | Stone ............... 315/74 |
| 4,148,536 | 4/1979 | Petropoulsos et al. ............... 339/42 |
| 4,152,557 | 5/1979 | Busch ............... 200/51.09 |
| 4,156,265 | 5/1979 | Rose ............... 361/179 |
| 4,179,175 | 12/1979 | Farnworth et al. . |
| 4,185,881 | 1/1980 | Foley et al. . |
| 4,230,386 | 10/1980 | Farnworth et al. . |
| 4,271,337 | 6/1981 | Barkas ............... 200/51.09 |
| 4,283,102 | 8/1981 | Richier ............... 339/42 |
| 4,285,022 | 8/1981 | Lewiner . |
| 4,441,134 | 4/1984 | Lewiner et al. ............... 361/45 |
| 4,456,322 | 6/1984 | Ferroni ............... 339/153 |
| 4,459,629 | 7/1984 | Titus ............... 361/13 |
| 4,485,282 | 11/1984 | Lee ............... 200/51 R |
| 4,568,997 | 2/1986 | Bienwald et al. ............... 361/45 |
| 4,618,907 | 10/1986 | Leopold ............... 361/45 |
| 4,623,209 | 11/1986 | Mangone ............... 339/75 R |
| 4,668,876 | 5/1987 | Skarman ............... 307/116 |
| 4,687,906 | 8/1987 | Fujishima et al. ............... 361/42 |
| 4,816,957 | 3/1989 | Irwin ............... 361/45 |
| 4,853,821 | 8/1989 | Lewis ............... 361/92 |
| 4,853,823 | 8/1989 | Arechavaleta et al. ............... 361/100 |
| 4,893,101 | 1/1990 | Robitaille ............... 335/18 |
| 4,915,639 | 4/1990 | Cohn et al. ............... 439/188 |
| 4,927,373 | 5/1990 | Dickie ............... 439/188 |
| 5,019,935 | 5/1991 | Nakamura ............... 361/45 |
| 5,029,037 | 7/1991 | Bartelink ............... 361/49 |
| 5,030,124 | 7/1991 | Lorentzon ............... 439/188 |
| 5,069,632 | 12/1991 | Avitan . |
| 5,112,237 | 5/1992 | Yang ............... 439/188 |
| 5,113,045 | 5/1992 | Crofton ............... 200/51.09 |
| 5,116,232 | 5/1992 | Follett ............... 439/107 |
| 5,186,639 | 2/1993 | Comerci ............... 439/188 |
| 5,191,499 | 5/1993 | Gaus et al. ............... 361/49 |

ELECTRICAL SUPPLY SAFETY PLUG

This is a continuation of application Ser. No. 07/726,875 filed Jul. 8, 1991 now abandoned.

BACKGROUND OF THE INVENTION

1. Field of the Invention

The present invention relates generally to electrical supply plug and, more particularly, to an electrical supply plug that is designed to promote safety by preventing electrical power to be supplied to an appliance unless the appliance is properly connected and the appliance is turned on. A main benefit of the present invention is that it is childproof.

2. Description of the Prior Art

It is well known to provide mains electrical supply safety sockets wherein the live and neutral outlets are covered with an insulating plate which is adapted to retract when the ground pin of a three pin plug is inserted into the ground outlet of the socket. It is generally arranged in such systems for the ground pin to be slightly longer than both the neutral and live pins in order to facilitate the operation of the safety mechanism.

The major drawback with such a system is that the insulating plate is liable to jam. If it jams in the closed position the socket is unusable but the safety device is inoperative. Furthermore, such a system is not childproof in that any object having a shape resembling a ground pin may be inserted into the ground outlet of the socket, thereby retracting the insulating plate and overriding the safety mechanism. Indeed, this approach is sometimes adopted in order to connect the supply leads from an electrical appliance directly to a mains electrical supply without first attaching a plug to the appliance, which is obviously highly unsatisfactory from a safety point of view.

Other inventive efforts have been made to promote safety with respect to mains electrical supply sockets. For example, U.S. Pat. No. 4,623,209 discloses such a safety promoting electrical socket. A brief description of this prior art device is now given.

U.S. Pat. No. 4,623,209 (Mangone) discloses an electrical safety socket including normally open switches for connecting live and neutral feeders to their respective socket outlets. The switches close when substantially parallel live and neutral pins of an electric plug are inserted into their corresponding socket outlets simultaneously. In such an arrangement, the insertion of each plug pin is adapted to pull 2 respective levers located external to the plug housing and articulated to a corresponding one of the switches. Such an arrangement allows independent operation of the switches and, since the levers are accessible from outside the plug housing, they may easily be operated independently of a plug being inserted into the socket. Consequently, foreign objects may be introduced into either socket outlet and the corresponding switch may be manually closed so as to complete the connection. Although both of the above-mentioned prior art techniques provide some degree of safety with respect to preventing an accidental or an otherwise unintentional connection to a mains electrical supply, neither prevent such a connection from occurring by anything other than a simple mechanical arrangement, which are often unreliable. Thus, it would be preferable that a similar technique be provided with at least the same degree of safety as the above-mentioned prior art techniques, but also increased reliability. Such a similar technique would be desirable since it is frequently becoming a requirement to include electrical safety features in the construction of new homes, office buildings, and the like. It is therefore desirable to provide such a similar technique and to overcome the shortcomings of the above-mentioned prior art techniques in this area.

SUMMARY OF THE INVENTION

The present invention contemplates an electrical supply safety plug that prevents power from a mains electrical supply (feeders) to be accessible to an appliance unless the appliance plug is properly engaged with the socket outlets and the appliance is turned on. Thus, according to the present invention there is provided an electrical supply safety plug comprising:

an electrical safety plug housing having live and neutral prongs and a first switching means for electrically connecting said live and neutral prongs to respective live and neutral socket outlets;

an electrical safety circuit having live and neutral inputs and a second switching means for electrically connecting said live and neutral inputs to respective live and neutral connections to the appliance;

the arrangement of said electrical supply safety plug being such that an appliance electrically connected across said live and neutral prongs is electrically connected to said live and neutral inputs by way of said first switching means and said second switching means.

The safety circuit operates to provide several distinct, although interrelated, safety functions. The primary function of the safety circuit is, of course, to prevent power from the mains electrical supply to be accessible to the appliance unless the safety plug is properly connected and the appliance is turned on. This function is accomplished by sensing whether such an appliance is in fact properly connected and appliance is properly turned on. If such is the case then the safety circuit, through a series of relay connections, allows power from the mains electrical supply to be accessible to the appliance.

A secondary function of the safety circuit is to monitor the current balance in the power being provided by the mains electrical supply. If a current imbalance is detected, such as a short circuit from power to ground in the appliance, then the safety circuit will prevent further power from the mains electrical supply from being accessible to the appliance. This secondary function thus provides an additional level of safety with respect to preventing power from a mains electrical supply to be accessible unless the power supplied by the mains electrical supply is current balanced.

A third function of the safety circuit is provided only after the secondary function has detected a current imbalance and power from the mains electrical supply is thereby prevented from being accessible. If such is the case, the third function of the safety circuit is to maintain this preventive state until either the condition that created the current imbalance is removed or, if the appliance is still connected and turned on, the appliance is turned off before being turned on again. Thus, only when the condition that created the current imbalance is cured and/or the appliance is disconnected or the appliance is turned off will power from the mains electrical supply be accessible to the appliance.

An important safety feature is provided with such operation wherein the safety circuit itself, when connected to the mains electrical supply, will shut the mains electrical supply down if an imbalance is detected in the line. This has application in preventing fires resulting from faulty wiring since the power is shut off upon the initial detection of an imbalance such as a short circuit. The safety circuit can thus be connected to lines, either directly by hard wiring or by simple plug-in connection to maintain safety of the line itself.

From the above descriptive summary, it is thus apparent how the present invention electrical supply safety plug overcomes the shortcomings of the above-mentioned prior art techniques.

Accordingly, the primary objective of the present invention is to provide an electrical supply plug that is designed to promote safety by preventing electrical power being supplied to an appliance unless the appliance is properly connected and the appliance is turned on. Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention electrical supply safety socket, reference is now made to the appended drawings. The drawings should not be construed as limiting the present invention, but are intended to be exemplary only.

PREFERRED EMBODIMENT OF THE INVENTION

Figure 1:
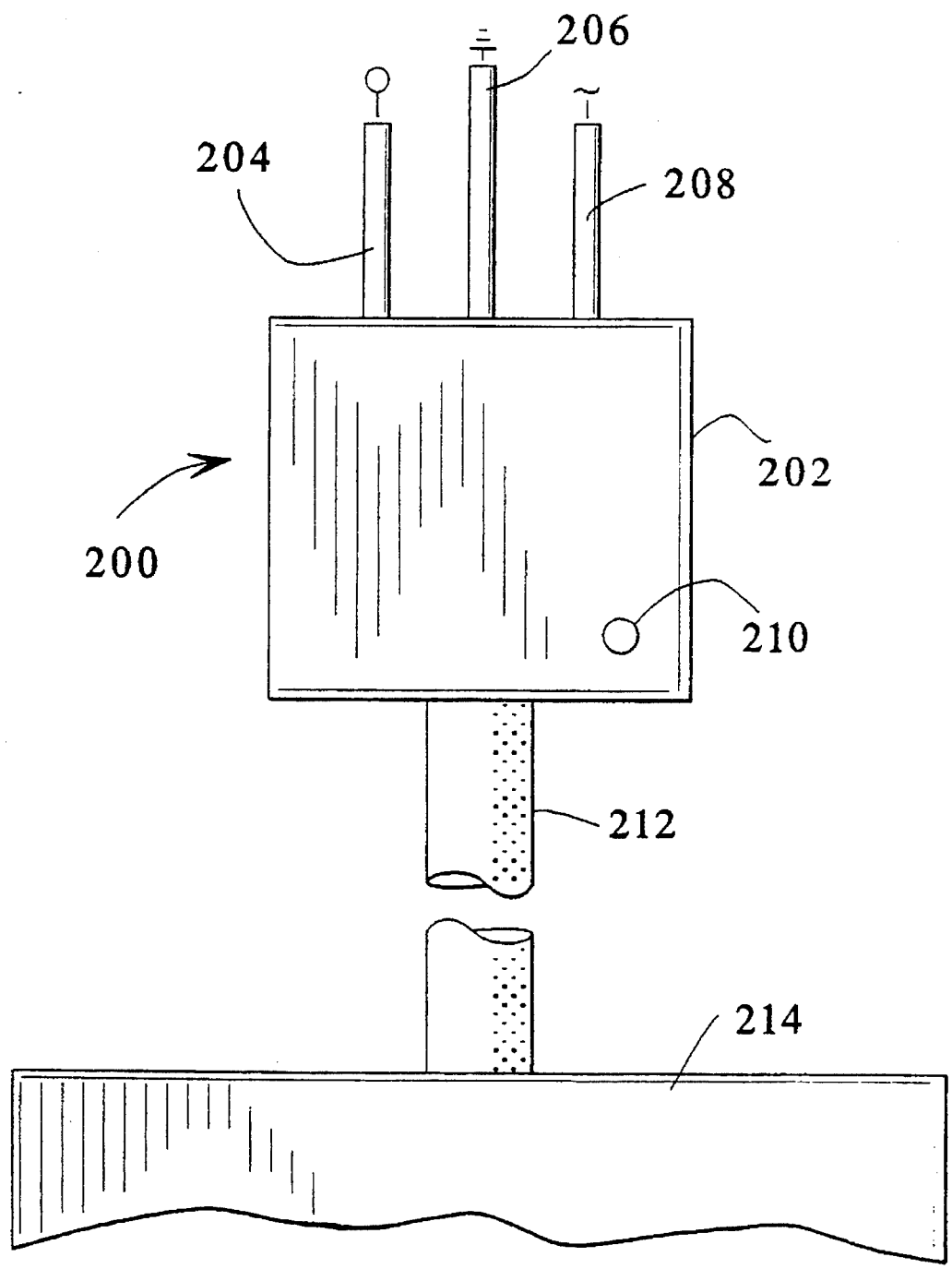
FIG. 1 is a schematic representation of an electrical supply safety plug according to the present invention with the plug shown connected to an electrical appliance via a power cord.
Figure 2:
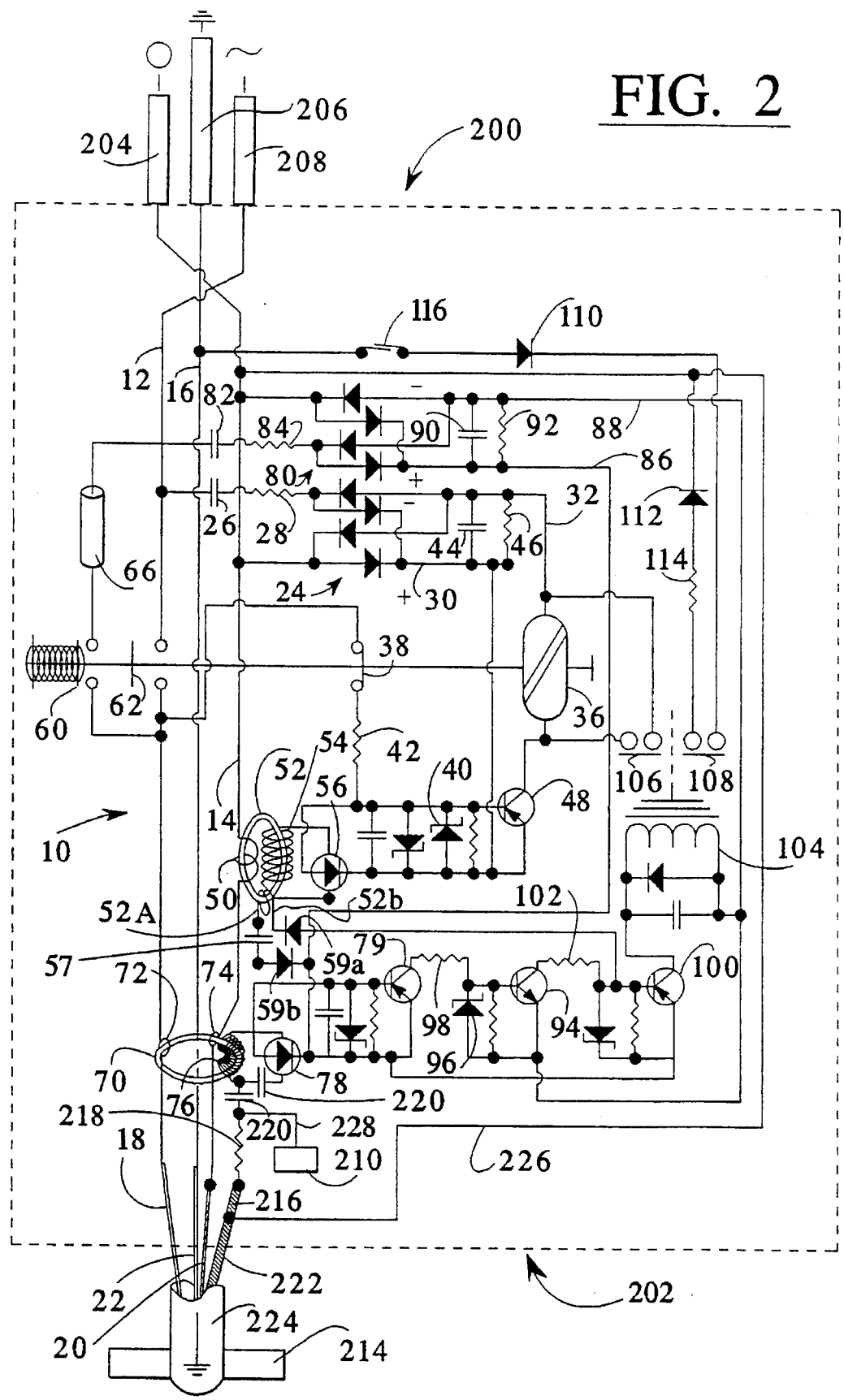
FIG. 2 is a schematic circuit diagram of the electrical supply safety plug of FIG. 1.

Referring to FIGS. 1 and 2 there is shown in FIG. 1 an electrical supply safety plug 200 which includes a housing 202 from which there projects three prongs 204, 206, 208 which are proportioned and spaced so as to fit a conventional electrical supply socket in order to provide electrical connections to live, neutral and ground feeders. The housing 202 includes a touch pad 210, the purpose of which will be discussed presently and a power cord 212 which is connected to an electrical appliance 214.

The schematic circuit diagram of the circuit elements which are mounted in the housing are shown in FIG. 2 in which the housing 202 is represented by the broken line.

Referring to FIG. 2, there is a schematic circuit diagram of an electrical safety plug circuit 10 according to the present invention. The safety circuit 10 provides live 12, neutral 14, and ground 16 inputs which are connected to respective live, neutral and ground feeders (not show). The safety circuit 10 also provides live 18, neutral 20, and ground 22 outputs which are connected to respective live, neutral, and ground lines of an appliance. The operation of the safety circuit 10 is such that several safety functions are performed, each of which is described as follows.

A primary function of the safety circuit 10 is to prevent power from a mains electrical supply (feeders) to be accessible at the appliance 214 unless the appliance 214 is properly connected to power and the appliance is turned on. To accomplish this function, a first low voltage bridge rectifier 24 is connected in series with a capacitor 26 and a resistor 28 across the live 12 and neutral 14 inputs so as to produce both a positive 30 and a negative 32 low D.C. voltage supply rail. It should be noted that the capacitor 26 and the resistor 28 serve to provide a high impedance which limits the effective A.C. voltage from the feeders across the first low voltage bridge rectifier 24, which in turn rectifies the resultant limited A.C. voltage so as to produce the low D.C. voltage across the positive 30 and negative 32 supply rails. The use of the capacitor 26 and the resistor 28 therefore obviates the need to use a transformer, which is more commonly used in conjunction with a bridge rectifier to produce a low D.C. voltage from a relatively high A.C. voltage input. Such transformers are generally bulky as compared to the capacitor 26 and the resistor 28 and, if used, would prevent the safety circuit 10 from being implemented within a standard electrical plug. The use of a transformer, in such application, is accordingly not desirable.

Connected in series between the positive 30 and negative 32 supply rails is a variable rate relay contact solenoid 36, which provides a single normally closed relay contact 38 and two normally open relay contacts 60, 62. When the variable rate relay contact solenoid 36 is in its de-energized state (when the appliance 214 is not turned on and/or the appliance 214, is not properly connected to the socket outlets), the single normally closed relay contact is closed and the two normally open relay contacts 60, 62 are open. The closure of the single normally closed relay contact 38 allows a connection to be made, through a series connected zener diode 40 and resistor 42, between the positive supply rail 30 and the live output 18. However, when the appliance 214 is not properly connected and turned on, or when there is otherwise an open circuit between the live output 18 and the neutral output 20, there is no current flow from the positive supply rail 30 to the live output 18, and hence no current flow back through the neutral output 20.

Also in this situation, the open state of the two normally open relay contacts 60, 62 prevents any power from the mains electrical supply from being accessible at the socket outlets.

Furthermore in this situation, a storage capacitor 44 that is connected in parallel between the positive 30 and negative 32 supply rails becomes charged at a rate determined by a similarly parallel connected resistor 46. This charged storage capacitor 44 provides a positive voltage to switch transistor 48, which is used to drive the relay 36 when the appliance 214 is properly connected and turned on, as will now be described.

When the appliance 214 is properly connected and turned on, the positive supply rail 30 provides current to the live output 18 that returns through the neutral output 20 and through a first winding 50 around a first toroid 52. The current through the neutral output winding 50 creates a magnetic flux in the first toroid 52 so as to produce a current in a second winding 54 that is connected to a second low voltage bridge rectifier 56. In response thereto, the second low voltage bridge rectifier 56 produces a positive voltage to switch transistor 48 which causes the switch transistor 48 to turn on, thus allowing the variable rate relay contact solenoid 36 to become energized by current passing between the positive 30 and negative 32 supply rails.

In its energized state, the variable rate relay contact solenoid 36 opens the normally closed relay contact 38 and closes the two normally open relay contacts 60, 62 in a predetermined sequence. Normally open relay contact 60 is the first to close and provides the live input 12 with a connection to the live output 18 through a series connected, fluid-filled resistor 66. The fluid-filled resistor 66 serves to dampen the initial connection between the live feeder and the live output, thereby preventing sparking when the relay contact 60 is closed. A fluid filled resistor is used since such a device can tolerate large instantaneous voltage differentials without burning out. It is presently preferred that the resistor 66 is a water-filled resistor. Normally open relay contact 62 is the second to close and provides the live input 12 with a direct connection to the live output 18.

The primary function of the safety circuit 10 as described so far thus prevent power from the mains electrical supply being accessible at the appliance 214 unless the appliance 214 is properly connected and the appliance 214 is turned on.

A secondary function of the safety circuit 10 is to monitor the current balance between the live output 18 and the neutral output 20 from the mains electrical supply, and to disconnect the mains electrical supply from the socket outlets if an imbalance is detected. To accomplish this secondary function, a second toroid 70 is provided around which a first winding 72 in the connection between the live input 12 and the live output 18 is maintained, and a second winding 74 in the connection between the neutral input 14 and the neutral output 20 is maintained. It should be noted that in order to properly monitor the current balance between the live output 18 and the neutral output 20, both of these windings 72, 74 should have the same number of turns and they should be wound so as to produce opposing magnetic fluxes in the core of the second toroid 70. Thus, when the current supplied by the live output 18 and the current returned by the neutral output 20 are not equally balanced, a net magnetic flux is created in the core of the second toroid 70. The cause of such a current imbalance could be a short circuit to ground in the appliance or any number of other occurrences having a similar effect.

There is a third winding 76 around the second toroid 70 that is connected to a third low voltage bridge rectifier 78. This third low voltage bridge rectifier 78 is connected to a third switch transistor 79 in a manner similar to that of the second low voltage bridge rectifier 56 and the second switch transistor 48. Thus, when a magnetic flux is created in the second toroid 70 due to a current imbalance, the third low voltage bridge rectifier 78 produces a positive voltage to the third switch transistor 79, which causes the third switch transistor 79 to turn on. The significance of this event will now be explained.

A fourth low voltage bridge rectifier 80 is connected, similar to the first low voltage bridge rectifier 24, in series with a capacitor 82 and a resistor 84 across the live 12 and neutral 14 inputs so as to produce both a positive 86 and a negative 88 low D.C. voltage supply rail. It should again be noted that the capacitor 82 and the resistor 84 serve to provide a high impedance which limits the effective A.C. voltage from the feeders across the fourth low voltage bridge rectifier 80, which in turn rectifies the resultant limited A.C. voltage so as to produce the low D.C. voltage across the positive 86 and negative 88 supply rails. Also similar to the first low voltage bridge rectifier 24, a capacitor 90 and a resistor 92 are connected in parallel across the positive 86 and negative 88 supply rails so as to provide a positive voltage to the third switch transistor 79 and to a fifth switch transistor 100, and a negative voltage to the emitter of a fourth switch transistor 94.

At this point it should be noted that a single low voltage bridge rectifier can be used to perform the functions of both the first low voltage bridge rectifier 24 and the fourth low voltage bridge rectifier 80. The first 24 and the fourth 80 low voltage bridge rectifiers are both shown here for redundancy and circuit clarity purposes.

With this in mind, when the third switch transistor 79 is turned on as a result of a current imbalance between the live output 18 and the neutral output 20, the positive supply rail 86 is allowed to drive the base of the fourth switch transistor 94 through a series connected diode 96 and resistor 98, thereby turning on the fourth switch transistor 94. In turn, when the fourth switch transistor 94 is turned on, the negative supply rail 88 is allowed to drive the base of the fifth switch transistor 100 through a series connected resistor 102, thereby turning on the fifth switch transistor 100 and allowing a normally open two-contact relay 104 to become energized by current passing between the positive 86 and negative 88 supply rails.

When the two-contact relay 104 is energized, a first normally open relay contact 106 is closed, thereby creating a short circuit connection across the variable rate relay contact solenoid 36. This short circuit connection results in the variable rate relay contact solenoid 36 being de-energized, which in turn results in the single normally closed relay contact 38 and the two normally open relay contacts 60,62 being placed in their respective closed and open positions. Thus, the connection between the live input 12 and the live output 18 is open circuited, thereby preventing power from the mains electrical supply from being accessible at the appliance 214.

Also when the two-contact relay 104 is energized, a second normally open relay contact 108 is closed, thereby creating a unidirectional electrical connection from the ground input 16 to the neutral input 14 by way of a pair of series connected diodes 110,112 and a series connected current protection resistor 114. This unidirectional electrical connection is provided to prevent a circuit breaker (not shown) associated with the mains electrical supply from being blown in the event that the current imbalance was caused by a short circuit to ground. It should be noted that this unidirectional electrical connection can also be made from the ground input 16 to the live input 12 or from the neutral input 14 to the live input 12. A series connected switch 116 is provided along the unidirectional electrical connection so as to make this connection user-selectable.

Connections 52a and 52b, from toroid 52, capacitor 57, and diodes 59a and 59b, serve to permit energizing of two-contact relay 104, with closing of relay contacts 106 and 108, and shut-off or current, when live and neutral outputs 18 and 20 are directly short-circuited.

The secondary function of the safety circuit 10 as described so far thus disconnects the mains electrical supply from the appliance 214 if a current imbalance is detected between the live output 18 and the neutral output 20. If such a current imbalance does occur and the secondary function of the safety circuit 10 performs as required, then a third function of the safety circuit 10 is provided. This third function prevents power from the mains electrical supply to be accessible at the appliance 214 after a current imbalance has been detected until either the condition that created the current imbalance is removed or, if the appliance is still turned on, the appliance is turned off and then turned on again. This third function is accomplished by the fact that once a current imbalance condition has been detected and the first normally open relay contact 106 is closed, thereby essentially short circuiting the positive 30 and negative 32 supply rails, the storage capacitor 44 becomes discharged and stays discharged for as long as there is a closed circuit across the live output 18 and the neutral output 20, or across the live output 18 and the ground output 22. Under either of these conditions, the variable rate relay contact solenoid 36 to become energized. Thus, only when the condition that created the current imbalance is cured and/or the plug is disconnected from power or the appliance is turned off will the safety circuit 10 be in a position to allow power from the mains electrical supply to be accessible at the appliance 214.

At this point it should be noted that the discrete components shown in FIG. 2 that are not specifically identified in the above written description perform basic circuit functions which are known to those with ordinary skill in the art. Accordingly, those discrete components that are not specifically identified above are not intended to be determinative with respect to the function of the present invention.

A wire 216 is connected to the winding 76 via a resistor 218 and a capacitor 220. The wire 216 is covered by a braided shield 222 and is placed in the power cord cover 224 as is shown in FIG. 2. The braided shield is connected to the neutral prong 204 via the line 226. Line 228 connects a point on the wire 216 between the resistor 218 and the capacitor 220 to the touch pad 210 which is mounted on the housing 202.

A user may touch the touch pad 210 with a finger to test the operation of the safety circuit 10 and the power to the appliance 214 will be cut off.

The wire 216 is connected to the housing of the appliance 214 in a conventional manner, which is not shown, or alternatively if the housing of the appliance is made of plastic, the inside of the housing may be sprayed with a conductive paint or film. If the inside of the housing is subjected to water, condensation or high humidity, the power to the appliance 214 will be shut off by the safety circuit. The wire 216 is also used to detect improper fluctuation of the current and to disconnect the appliance from power in the event of current fluctuation beyond a preselected level. The wires 216, 226 also serve to disconnect the appliance and to protect the appliance from current fluctuations caused by lightning.

With both the present invention safety circuit 10 and the safety plug 200 now fully described it can thus be seen that the objectives set forth above are efficiently attained and, since certain changes may be made in the above-described circuit 10 and plug 200 without departing from the scope of the present invention, it is intended that all matter contained in the above description or shown in the accompanying drawings shall be interpreted as illustrative and not in a limiting sense.

What is claimed is:

1. An electrical safety plug for connection to the end of a power cord of an electrical appliance, the power cord having a live conductor and a neutral conductor, the appliance having an ON condition which establishes a completed electrical path between the live and neutral conductors of the power cord, comprising:

a plug housing;

a live prong projecting from said housing for connection to a source of electrical power having live and neutral lines;

a neutral prong projecting from said housing for connection to the source of electrical power;

a live output connectable to the live conductor of the power cord of an appliance;

a neutral output connectable to the neutral conductor of the power cord of the appliance;

a switching circuit electrically connected between said live and neutral prongs and said live and neutral outputs, respectively, said switching circuit including a switch having (i) a normally open state in which said live and neutral prongs are disconnected from said live and neutral outputs, and (ii) a closed state in which said live and neutral prongs are connected to said live and neutral outputs., said switch being electrically activatable to said closed state;

a first circuit for enabling said switch to said closed state when said live and neutral prongs are electrically connected to the live and neutral lines, respectively; and when an electrical circuit across said live and neutral outputs is completed, said electrical circuit being completed when the appliance is in said ON condition; and a second circuit for monitoring the current at said live and neutral outputs and for disabling said switch to said open state when a current imbalance is detected;

a touch pad mounted on said plug housing; and a third circuit connected to said touch pad and said second circuit for disabling said switch to said open state responsive to a user touching said touch pad.

2. An electrical safety plug according to claim 1, in which said second circuit further comprises:

means for detection of a short circuit in the appliance; and means for disconnecting the appliance from power responsive to detection of said short circuit.

3. An electrical safety plug according to claim 1, in which said switching comprises a plurality of relay contact switches connected to a relay contact solenoid.

4. An electrical safety plug according to claim 3, in which selected relay contacts of said plurality of relay contact switches are disposed to close in sequence.

5. An electrical safety plug according to claim 6, in which said switching circuit further comprises resistor means for the purpose of sequential application of power to said appliance.

6. An electrical safety plug according to claim 1, wherein said first circuit comprises:

a rectifier circuit connected to said live and neutral prongs, for deriving a low D.C. voltage output therefrom;

a detector circuit operating off said low D.C. voltage, for detecting whether an electrical circuit across said live and neutral outputs is completed; and a switching circuit operating off said low D.C. voltage and responsive to said detector circuit, for enabling said relay contact solenoid when said electrical circuit across said live and neutral outputs is completed.

7. An electrical safety plug according to claim 6, wherein a high impedance element is connected in series between said rectifier circuit and said live and neutral prongs.

8. An electrical safety plug according to claim 7, wherein said high impedance element comprises a capacitor.

9. An electrical safety plug according to claim 8, wherein said detector circuit comprises a toroid for sensing current flow across said live and neutral outputs.

10. An electrical safety plug according to claim 9, wherein said sensed current flow is initially derived from said low D.C. voltage.

11. An electrical safety plug according to claim 12, wherein said first circuit further comprises a dampening circuit connected between said source of electrical power and the electrical appliance so as to initially dampen an electrical connection made between said source of electrical power and the electrical appliance.

12. A electrical safety plug according to claim 11, wherein said dampening circuit comprises a dampening element connected in series with a relay contact switch.

13. An electrical safety plug according to claim 12, wherein said dampening element comprises a fluid filled resistor.

14. An electrical safety plug according to claim 13, wherein said relay contact solenoid operates by opening and closing relay contact switches in sequence, and wherein said relay contact switch in said dampening circuit is closed first in order to initially dampen said electrical connection made between the source of electrical power and the electrical appliance.

15. An electrical safety plug according to claim 14, wherein said switching circuit comprises a switch transistor connected in series with said relay contact solenoid across said low D.C. voltage output, said switch transistor allowing current derived from said low D.C. voltage to flow therethrough so as to energize said relay contact solenoid, thereby enabling said relay contact solenoid.

16. An electrical safety plug according to claim 1, wherein said first circuit comprises:

a rectifier circuit connected to said live and neutral prongs, for deriving a low D.C. voltage output therefrom;

a monitor circuit operating off said low D.C. voltage, for monitoring the current at said live and neutral outputs; and said switch operating off said low D.C. voltage and responsive to said monitor circuit, for disabling said switch when a current imbalance is detected.

17. An electrical safety plug according to claim 16, and further including a user-selectable switch connected in series with said relay contact solenoid.

* * * * *